United States Patent [19]
Ziegler

[11] 3,858,345
[45] Jan. 7, 1975

[54] FISHING TACKLE BOX

[76] Inventor: Raymond J. Ziegler, 16185 W. 14th Pl., Golden, Colo. 80401

[22] Filed: Oct. 29, 1973

[21] Appl. No.: 410,525

[52] U.S. Cl.............................................. 43/57.5 R
[51] Int. Cl............................................ A01k 97/06
[58] Field of Search..................... 43/57.5, 54.5, 55; 206/45.13, 45.14; 220/20

[56] References Cited
UNITED STATES PATENTS
2,447,105  8/1948  Vogel............................... 43/57.5 R
3,739,518  6/1973  Ziegler............................. 43/57.5 R

*Primary Examiner*—Warner H. Camp
*Attorney, Agent, or Firm*—Bertha L. MacGregor

[57] ABSTRACT

A front member consists of an inclined flat front panel and opposite triangularly shaped ends rigidly connected to the front panel and a rear member consists of a flat rear panel and a cover pivotally or flexibly connected together. The two major members are joined by pivotal connections between the two ends and the rear panel lower edge. The combination front panel and ends moves automatically by gravity when the cover is manually released from its frictional engagement with the front panel to expose a relatively wide access opening to the box interior and to a fish hook mounting bar fastened to the inner surface of the front panel adjacent said opening.

7 Claims, 4 Drawing Figures

Patented Jan. 7, 1975    3,858,345

FISHING TACKLE BOX

This invention relates to a fishing tackle box for containing and supporting fish hooks and other equipment in selected positions in the box without becoming entangled or disarranged.

An object of the invention is to provide a fishing tackle box which is simple in construction, designed to be carried by the belt of a user of the box, having a main container member including a flat front panel and two generally triangularly shaped ends rigidly connected to the front panel, pivotally connected to the lower edge of a rear panel and movable by gravity to a position wherein the contents are exposed and conveniently accessible to the user when the box cover has been manually moved to open position.

The tackle box of this invention is an improvement on the construction disclosed in my U.S. Pat. No. 3,739,518, particularly with respect to the means whereby the front container member moves pivotally and automatically by gravity, when the cover has been opened, to provide a wide access opening between the upper ends of the front and rear panels of the box. The wide access opening conveniently exposes the contents of the box and provides ample space between the converging inner surfaces of the front and rear panels for insertion of the hand of a user for handling the box contents. Another advantage of the invention of this application is the elimination of some of the springs previously employed in the patented structure, and the elimination of a bottom panel or panels between the front and rear panels of the box.

Figure 1:
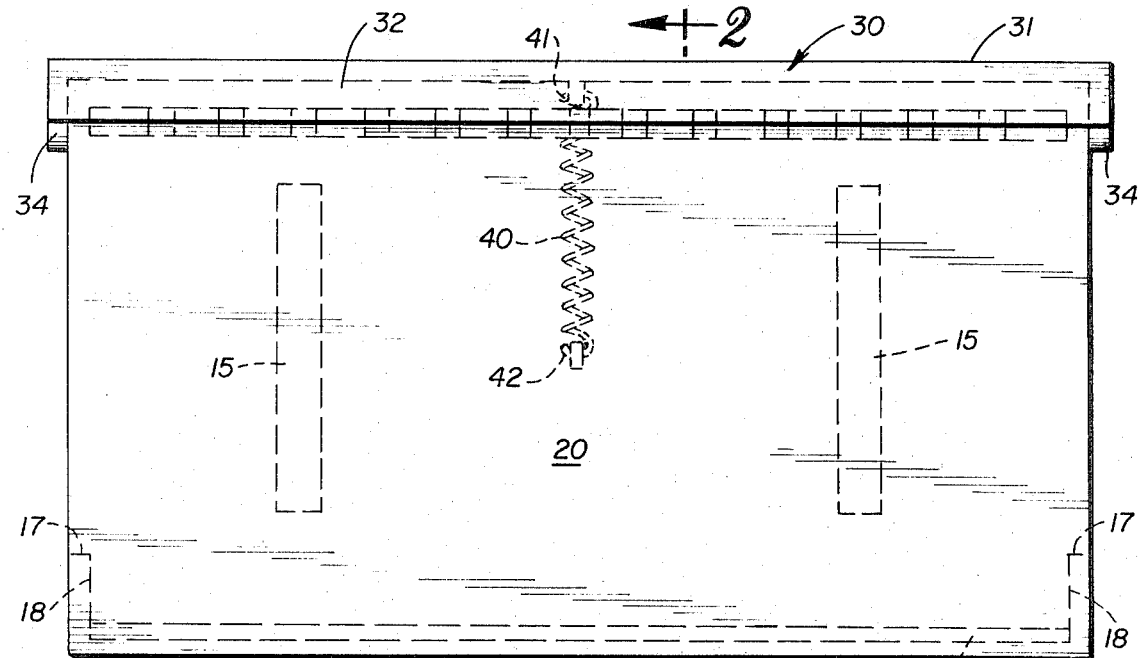
FIG. 1 is an elevational front view of a fishing tackle box embodying my invention.
Figure 3:
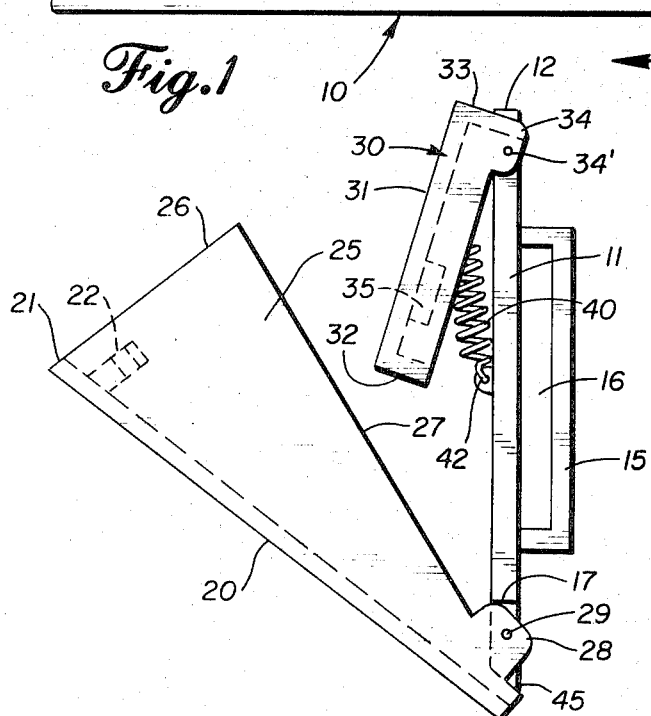
FIG. 3 is an elevational end view of the fishing tackle box, viewed from the right hand end of FIG. 1, showing the box and cover in open position.
Figure 2:
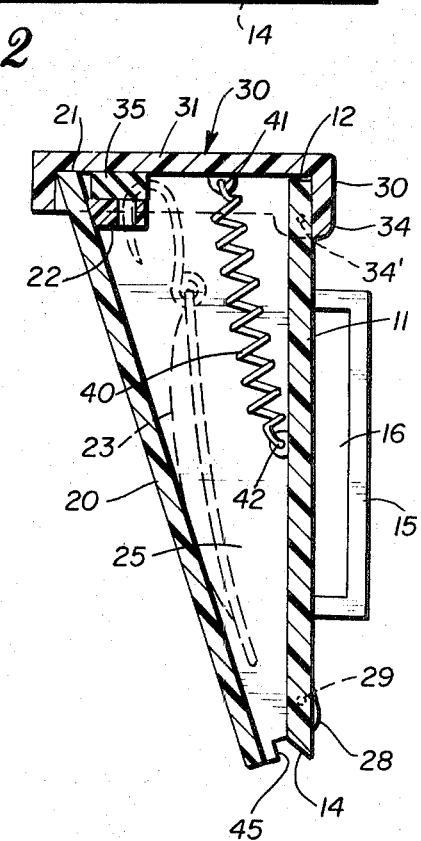
FIG. 2 is a transverse vertical sectional view in the plane of the line 2—2 of FIG. 1, showing the box and cover in closed position.

In the embodiment of the invention shown in FIGS. 1-3, the tackle box 10 comprises a vertically disposed flat rear panel 11, preferably rectangular in shape, having a flat upper edge 12 and a beveled bottom edge 14. The edge 14 may be flat but preferably is beveled, as shown in FIGS. 2 and 3. A pair of rigid belt clips 15 are attached to the outer surface of the rear panel 11 and spaced from said rear panel to provide spaces 16 for reception of the belt of a user of the box 10. The rear panel 11 is cut away as indicated in FIG. 1, on the horizontal line 17 and vertical line 18 to accommodate means for attachment of the box ends described hereinafter.

The front of the tackle box 10 is a panel 20, preferably rectangular in shape, and dimensioned to provide a beveled upper edge 21 in the same plane as the upper edge 12 of the rear panel 11 when the box 10 is in its closed position. An apertured bar 22 is fastened to the inner surface of the front panel 20 near but spaced from the upper edge 21, as shown in FIGS. 2 and 3, extending from end to end of the box as shown in FIG. 1. The bar 22 is designed to receive fish hooks or lures 23 as shown in FIG. 2.

The front panel 20 is connected at each end to an end panel 25 which is generally triangular in shape, the lower angle of which is about 20°. When the front panel 20 and ends 25 are in the FIG. 2 position, the upper edges 26 of the end panels 25 are in the same plane as the edge 21 of the front panel 20 and the edge 12 of the rear panel 11. The rearward edges 27 of the end panels 25 each are provided with a rearwardly projecting ear 28 movable into the space provided by the cut away edges 17 and 18 in the rear panel 11. The end panels are pivotally fastened to the rear panel by pins 29 extending through the ears 28 into the side edges of the rear panel 11.

A cover 30 consists of a top wall 31, front wall 32, rear wall 33 and two end walls 34. The end walls have extensions pivotally connected at 34' to the rear panel 11. A resilient pad 35 is fastened on the inner surface of the cover top wall 31. The pad 35 bears on the apertured bar 22 and hooks 23 supported thereon when the cover 30 is in closed position. The cover 30, as shown in FIG. 2, is held in closed position by the coiled spring 40 attached at one of its ends 41 to the cover and at its other end 42 to the rear panel 11.

Figure 4:
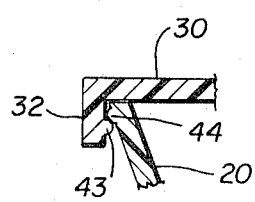
FIG. 4 is a fragmentary view of a modified detail of construction showing the box cover provided with means frictionally engaging the upper edge portion of the front panel for closing the box.

A modified means for holding the cover 30 in closed position is shown in FIG. 4, where the front wall 32 of the cover is provided with a projection 43 which engages the projection 44 on the front panel 20 adjacent its upper edge. Other frictionally engaging means may be used to hold the cover in closed position.

The tackle box 10 may be made of plastic material which is slightly flexible so that the projection 43 yieldingly engages the front panel 20 provided with the lip 44. The spring 40 may be dispensed with if the FIG. 4 construction is used for releasably holding the cover 30 down on the upper edges of the front and end panels of the box.

When the belt of a user of the tackle box has been inserted into the spaces 16 defined by the clips 15, the rear panel 11 will be in substantially vertical position, and the front panel extends at an approximately 18° angle to the vertical, as shown in FIG. 2. When the cover 30 is raised manually to release it from engagement with the front panel 20, said front panel and both end panels 25 fall by gravity into the FIG. 3 position, where the front panel extends at an approximately 52 degree angle to the rear panel 11. In that position, the cover 30 drops by gravity (with or without the spring 40) into the space in the box adjacent the rear panel. The extent of movement of the front panel and end panels relatively to the rear panel 11 is limited to about 50° by the contact between the lower edge 45 of the front panel 20 and the edge 14 of the rear panel 11. The construction shown makes it possible to dispense with a bottom wall in the box, and to gain the advantage of opening the box by gravity for convenient access to the interior, while retaining hooks 23 in their intended arrangements in the box. The box may be closed conveniently by raising the cover and moving the front panel rearwardly into position for replacement of the cover.

In place of using the pivotal connection 34' for connecting the cover 30 to the rear panel 11, the cover and rear panel may be integrally formed of plastic material which is sufficiently flexible to provide a flexible hinge between the cover and rear panel.

I claim:
1. A fish tackle box comprising
   a. a flat front panel,
   b. opposite generally triangularly shaped end panels projecting from the front panel with a wide end thereof facing upwardly,
   c. a rear panel to which the end panels are pivotally attached at their lower ends with the front panel sloping downwardly toward the rear panel,
   d. a cover hingedly attached to the rear panel engaging the upper part of the front panel in closed position, said front and end panels moving pivotally downwardly and outwardly by gravity relatively to the rear panel when the cover is moved manually to disengage it from the front panel and open the box when the rear panel is supported substantially upright.

2. The fishing tackle box defined by claim 1, in which the rear panel is provided with belt receiving means and is generally vertically disposed when carried by the belt of a user, and the front panel is inclined downwardly from its upper portion toward the rear panel at an angle of approximately twenty degrees when the box is closed and makes an angle of approximately fifty degrees when the box is opened by disengaging the cover from the front panel by abutment of said front panel against the lower edge of the rear panel.

3. The fishing tackle box defined by claim 1, which includes a fish hook carrying bar mounted on the inner surface of the front panel adjacent its upper edge, and a resilient pad mounted on the inner surface of the cover overlying the bar when the box is closed, said bar and box contents being automatically exposed when the cover is disengaged from the front panel and said front panel and end panels have moved by gravity away from the rear panel and provide a wide access opening.

4. The fishing tackle box defined by claim 1, which includes a pair of spaced apart belt receiving clips mounted on the outer surface of the rear panel and retaining the rear panel in generally vertical position when the box is carried by the belt of a user, said front panel being inclined from its upper edge inwardly and downwardly to the lower edge of the rear panel at a predetermined angle when the cover is in closed position engaging the front panel, and said front panel being inclined at a greater angle when the cover is in open position and the front panel has moved pivotally outwardly by gravity.

5. The fishing tackle box defined by claim 1, in which the end panels are provided with rearwardly extending ears adjacent their lower ends, said ears being pivotally pinned to the rear panel.

6. The fishing tackle box defined by claim 5, in which the rear panel is cut away adjacent its lower side edges to receive the ears and pivot pins connecting the ears to said rear panel.

7. The fishing tackle box defined by claim 1, including means normally biasing the cover for movement into the box when the front panel moves outwardly.

* * * * *